(12) United States Patent
Le Tourneur et al.

(10) Patent No.: US 7,555,116 B1
(45) Date of Patent: Jun. 30, 2009

(54) REAL TIME PROCESSING AND MANAGEMENT METHOD FOR CANCELLING OUT THE ECHO BETWEEN A LOUDSPEAKER AND A MICROPHONE OF A COMPUTER TERMINAL

(75) Inventors: Grégolre Le Tourneur, Saint-Quay-Perros (FR); David Deleam, Perros Guirec (FR)

(73) Assignee: France Telecom, Paris (FR)

( * ) Notice: Subject to any disclaimer, the term of this patent is extended or adjusted under 35 U.S.C. 154(b) by 509 days.

(21) Appl. No.: 10/148,856

(22) PCT Filed: Jun. 27, 2000

(86) PCT No.: PCT/FR00/01792

§ 371 (c)(1),
(2), (4) Date: Oct. 28, 2002

(87) PCT Pub. No.: WO01/45375

PCT Pub. Date: Jun. 21, 2001

(30) Foreign Application Priority Data

Dec. 14, 1999 (FR) .................................. 99 15742

(51) Int. Cl.
*H04M 9/08* (2006.01)
(52) U.S. Cl. ................................. 379/406.03
(58) Field of Classification Search ................. 381/71.9, 381/94.7, 94.9, 71.11, 71.12; 379/406.03
See application file for complete search history.

(56) References Cited

U.S. PATENT DOCUMENTS 6,154,497 A * 11/2000 Gatherer et al. ............. 375/247
6,778,671 B1 * 8/2004 Graumann .................. 381/66

FOREIGN PATENT DOCUMENTS

| EP | 0 709 999 A2 | 5/1996 |
| EP | 0 741 471 A1 | 11/1996 |
| EP | 0 895 397 A2 | 2/1999 |

OTHER PUBLICATIONS

International Search Report Publication No. PCT/FR 00 01792; Report dated Aug. 28, 2000.

* cited by examiner

*Primary Examiner*—Alexander Jamal
(74) *Attorney, Agent, or Firm*—Drinker Biddle & Reath LLP

(57) ABSTRACT

The invention relates to a real time processing and management method for canceling out the echo between a loudspeaker (HP) and a microphone (M) of a computer terminal. Said method consists of establishing the loudspeaker signal or the microphone signal as a reference signal and synchronizing (A) the other signal with said reference signal, and (B) synchronizing the acquisition and audio reestablishment tasks. The delay that exists ($re_j$) between the other signal and the reference signal is measured (C) and the existing delay value ($re_j$) is validated (D) in order to control the delay applied to the reference signal starting from the current delay ($re_j$). The invention can be used for computer terminals which are equipped with multi-tasks operating systems.

9 Claims, 5 Drawing Sheets

REAL TIME PROCESSING AND MANAGEMENT METHOD FOR CANCELLING OUT THE ECHO BETWEEN A LOUDSPEAKER AND A MICROPHONE OF A COMPUTER TERMINAL

FIELD OF THE INVENTION

The invention relates to a real time processing and management method for echo cancellation between a loudspeaker and a microphone of a computer terminal.

BACKGROUND

The acoustic echo present in the microphone signal by virtue of parasitic coupling between the loudspeaker and the microphone of a computer terminal, a terminal such as a personal computer, or PC, a workstation or any other machine, is the major obstacle to the proper hands-free operation of software for voice communication between users. This acoustic echo results from the signal transmitted by the loudspeaker and picked up, at least partially, by the microphone on account of this parasitic coupling.

The echo cancellation algorithms are tailored to such an application context, and hands-free communication between videoconferencing terminals presents an undeniable attraction, despite the delay inherent in this mode of communication.

With this aim, the solutions currently proposed consist essentially of a system external to the terminal, or to the host machine, termed "add on audio".

The implementation of such systems nevertheless constitutes a brake on the dissemination of communication products on account, on the one hand, of the additional costs generated and, on the other hand, of the difficulties of installation.

One possibility, for removing an encumbrance such as this, can consist in incorporating such an echo cancellation function into real time processing, by using software, in the host machine, as a task in its own right in the same way as the necessary specific tasks, such as sound coding/decoding task, image processing, interfacing with the network.

A priori, the operation of porting echo cancelling software onto a host machine, such as a PC computer, does not in itself constitute an obstacle, the processor of such machines being programmable in a high-level language and, generally, endowed with computational power which is compatible with the intended application, at least on machines of recent generation.

However, such an operation is confronted with the problem of synchronizing the audio data streams, incoming streams and outgoing streams, for the implementation of the echo cancellation function. These streams are generated by the sound card of the host machine.

When a task uses just an input stream and an output stream, and also in the case of the coding/decoding of speech, image processing and network interfacing, the synchronization process is relatively simple insofar as the end of the filling of an input buffer, or buffer memory, triggers the execution of the relevant task, then the filling of an output buffer when execution of the task has ended.

On the contrary, in the case of echo cancellation between loudspeaker and microphone of a computer terminal, in which case, as represented in FIG. 1, an echo canceller element AEC constituted by an adaptive filter making it possible to reinject for subtraction on the microphone signal a fraction of the loudspeaker signal, the aforesaid echo canceller requires the existence of two input streams, signal originating from the microphone termed the microphone signal smic, and signal originating from the remote party, bound for the loudspeaker and therefore termed the loudspeaker signal shp.

The echo cancellation process is based on estimating the impulse response of the loudspeaker/microphone parasitic coupling. The echo canceller AEC generates one or two output streams comprising at least the reinjected fraction of the loudspeaker signal.

Such a modus operandi therefore makes it necessary to wait for the end of the filling of two input buffers so as to proceed with the instigation of the relevant echo cancellation task. Furthermore, and vitally, the two incoming data streams must be perfectly synchronous, so as to allow correct estimation of the acoustic transfer function of the parasitic coupling, obtained from the impulse response.

When, in the case of the prior art, the echo cancellation function is carried out by way of a DSP card, card furnished with a dedicated signal processor, or where appropriate by way of an additional audio element or "add on audio", the aforesaid vital condition of perfect synchronism is satisfied, since just a single clock, that of the DSP card or "add on" is used to drive, at the same time, the analog/digital converter operating on the microphone signal, the transferring of the digital data to the signal processor, the synchronization, by interrupt for example, of the computational program in the dedicated signal processor and to supply the computed samples to the digital/analog converter intended for the loudspeaker. Furthermore, the echo cancellation task and the corresponding computational operations are the only ones carried out by the signal processor when the latter is a dedicated signal processor, or at the very least are carried out in an ultra-priority manner.

The porting of the aforesaid task to a host machine nevertheless comes up against the major technical difficulties hereinbelow.

The management of the audio data streams is performed, in such a case, on the basis of software layers, such as layers managed by the operating system or the APIs, standing for Application Program Interfaces, when the WINDOWS® operating system is used. These software layers mask the real time constraints related to the audio signals acquisition/playback processes. However, to obtain maximum portability of the software, it is not conceivable to use software layers whose object code is specially tailored to the structure of the host machine, since it would then be necessary to rewrite them and this would, moreover, practically require one software version per type of machine.

Despite the allocating of a high priority to the aforesaid echo cancellation task, the system tasks, required for the implementation of the operating system, may however interrupt the running of the echo cancellation processing program and may, consequently, block, one, the other or both of the audio data streams, and thus cause a discontinuity in the speech signals acquisition/playback process.

Thus, by way of illustration, it is recalled that, during the transmission of a sound on the basis of speech samples, an initialization of the sound card is firstly undertaken, by designating the sampling frequency, the size and the number of buffers or buffer memories used to cater for the transfer of data. A first phase then consists in filling all the designated buffers and in validating their read output. When this first phase is completed, the operating system places itself on standby waiting for the buffers played or read. Specifically, the "thread" or processing task in a multitask operating system is activated on indication of the sound card only if at least one of the buffers has been read.

A similar manner of operation also governs the write acquisition of samples originating from the input of the microphone of the sound card. Under these conditions, the number of buffers which can be used by the APIs, standing for Application Program Interfaces, of the sound card is likewise designated. The latter returns an indication to the operating system making it possible to identify the buffer which has just been write filled.

To circumvent the problems of fine management of the operations for writing/reading the buffers, it is preferable to designate a considerable number of buffers of large size.

Unfortunately, such a choice leads to a considerable delay, possibly of up to a few seconds, in the audio chain. Although such a delay engenders no major consequence in the case of current applications, such as games, using only the sound output on PC personal computers, this delay proves to be, on the contrary, catastrophic for a bidirectional communication system or application.

Specifically, in an audio full duplex communication application, any delay introduced into one or the other of the communications has a particularly harmful influence on the naturalness and fluency of the conversation.

For this reason, it is necessary to work with the smallest possible size and number of buffers, in order to discretize and reduce each delay time introduced. However, the management and interruption of the sound acquisition/playback tasks are rendered particularly critical by this constraint.

Furthermore, the halting of the aforesaid acquisition and playback software tasks translates into a decrease or an increase in the delay between the mike signal and the loudspeaker signal, this delay thus being rendered variable. Specifically, the sound card not being completely tied to the operating system, the degree of autonomy of the sound card allowing a certain lightening of the burden and of the exploitation time of the central processor and of the operating system, a time shift occurs between the hardware modules of the card, on account of their partial autonomy, and the software modules being sensitive to the various demands of the operating system.

Although the human ear is only averagely sensitive, or is sensitive to these delays only onward of a certain value of the stream interrupt times, the echo cancellation processes and the echo cancellation systems implementing the latter lose their time reference completely. Consequently, a discontinuity in the audio streams translates into a time shift in the impulse response of the loudspeaker/microphone parasitic coupling, estimated by the echo canceller. In the worst case, the time window for estimating the impulse response of the parasitic coupling between the loudspeaker and the microphone being limited by the number of coefficients of the echo canceller, constituted by an adaptable digital filter, the temporal discontinuity in sound acquisition/playback may lead to the situation in which the aforesaid parasitic physical coupling, which cannot be made evident other than during the existence of the loudspeaker signal, appears outside this estimation window. The echo canceller then no longer produces any effect.

Thus, the problems to be solved in respect of a software installation, allowing real time processing, of the echo cancellation functions on a computer terminal, consist, on the one hand, in that the initial delay between the loudspeaker signal and the microphone signal is variable from one computer terminal to another, and in that, on the other hand, this delay varies over time, either as a result of actions controlled by the operating system of the terminal, or as a result of a phenomenon of drifting of the clocks with which the terminal is equipped.

OBJECTS OF THE INVENTION

The object of the present invention is to remedy the drawbacks and problems of the prior art systems, with a view to allowing effective installation of echo cancellation functions in software form so as to cater for real time processing on computer terminals of any type.

With this aim, the object of the present invention is more especially, having regard to the choice of an echo cancellation algorithm specifically tailored to a real time processing context such as this, to reduce as far as possible the sensitivity of the sound acquisition/playback process in relation to higher priority tasks managed by the operating system of the terminal.

Consequently, another object of the present invention is also to preclude any risk of clock drift between the microphone signal and the loudspeaker signal, by oversampling followed by subsampling of these signals, the management of the change of sampling frequency being performed in a software manner in the acquisition/playback task or tasks.

Another object of the present invention is furthermore the implementation of a method of on-line processing of echo cancellation in a computer terminal allowing periodic estimation of the physical delay between the loudspeaker and microphone audio streams.

SUMMARY OF THE INVENTION

Another object of the present invention is finally, on the basis of the estimated value of this physical delay, the implementation of a method making it possible to correct this delay, so as to optimally reset the estimated impulse response of the loudspeaker/microphone parasitic coupling, in the echo canceller analysis window.

The real time processing and management method for echo cancellation between a loudspeaker and a microphone of a computer terminal managed by a multitask operating system catering for audio acquisition and playback, subject of the present invention, applies to an echo cancellation process, the echo being caused by parasitic physical coupling between the loudspeaker and the microphone delivering a microphone signal and corrected by subtracting from the microphone signal a correction signal formed by a fraction of the loudspeaker signal delayed and filtered.

It comprises the steps of establishing one of the loudspeaker, respectively microphone, signals as reference signal and of synchronizing the other microphone, respectively loudspeaker, signal with respect to this reference signal and of synchronizing the audio acquisition and playback tasks. It furthermore comprises the step of periodically measuring the existing delay between the other signal and the reference signal, so as to obtain a measured value of existing delay. The measurement of existing delay is then validated so as to obtain a value of current delay and the delay applied to the reference signal is controlled on the basis of this current delay, so as to cancel the echo signal.

The method which is the subject of the present invention finds application to computer terminals of any type, furnished with an operating system from the WINDOWS® 98 or NT family, BeOS, UNIX or similar operating systems.

BRIEF DESCRIPTION OF THE DRAWINGS

It will be better understood on reading the description and on looking at the drawings below in which, apart from FIG. 1 relating to the prior art.

MORE DETAILED DESCRIPTION

A more detailed description of the real time processing and management method for echo cancellation between a loudspeaker HP and a microphone M of a computer terminal will now be given in conjunction with FIG. 2a and the following figures.

Figure 1:
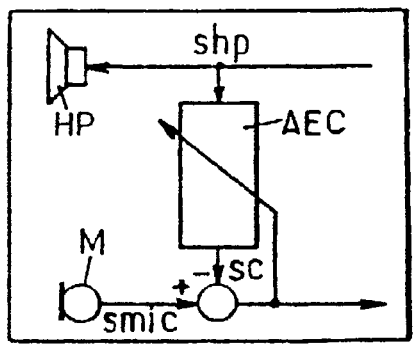

It is recalled firstly, with reference to FIG. 1, that the loudspeaker HP receives the loudspeaker signal, denoted shp, and that the microphone delivers the microphone signal, denoted smic. Furthermore, it is recalled that within the framework of a multitask operating system OS, audio acquisition/playback is managed by the latter within the framework of an application commonly termed API when the operating system is for example the WINDOWS® system. It is also recalled that the echo is generated by parasitic physical coupling between the loudspeaker HP receiving the loudspeaker signal shp and the microphone delivering the microphone signal smic, which is marred by a parasitic signal due to the aforesaid echo transmitted by the previously mentioned parasitic physical coupling. The microphone signal can then be corrected by subtracting from the microphone signal smic a correction signal sc formed by a fraction of the loudspeaker signal shp filtered by the adaptive filter of the echo canceller, denoted AEC in FIG. 1.

Figure 2A:
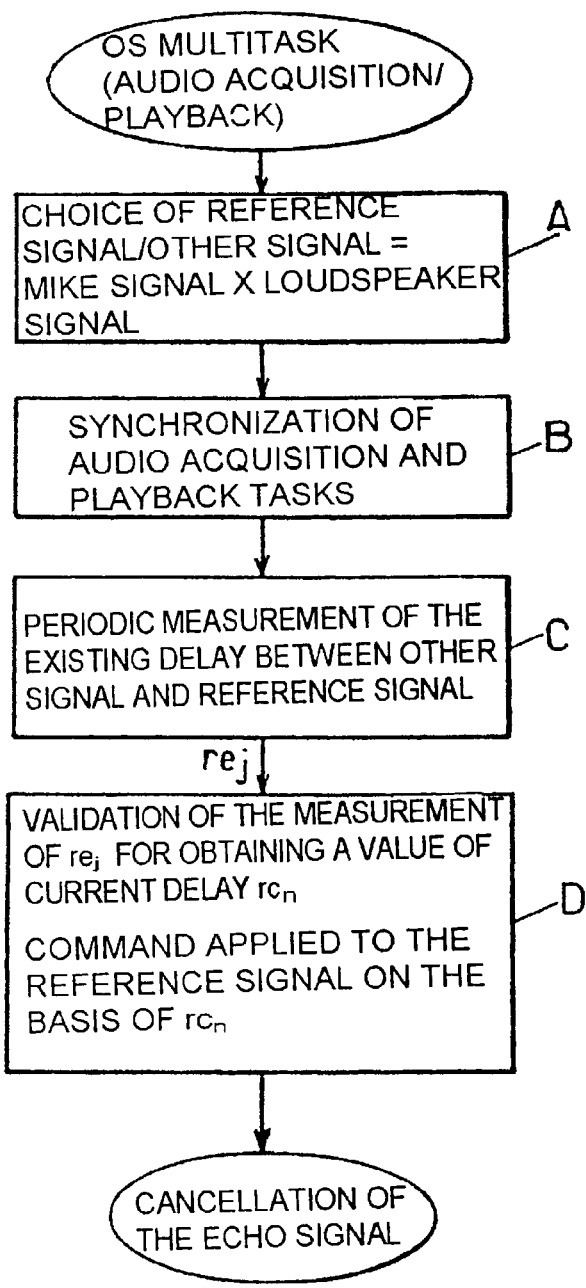
FIG. 2a represents, by way of illustration, a flowchart of the steps for implementing the method which is the subject of the present invention.

With reference to FIG. 2a, it is indicated that the method which is the subject of the present invention is noteworthy in that it consists, in a step A in establishing one of the loudspeaker shp or microphone smic signals as reference signal and in synchronizing the other signal, the microphone, respectively loudspeaker, signal, with respect to this reference signal.

Step A makes it possible to simplify the problem to be solved by thus favoring an algorithmic processing solution which, in fact, modifies just one of the audio streams, the other stream thus being constituted as a reference stream. This modus operandi makes it possible to manage the two different streams at input and at output, the processing algorithm thus being tailored to the context. By way of nonlimiting example, it is indicated that the processing algorithm can consist of the $APA_2$ algorithm described in French Patent Application 2 738 695. The processing process thus introduced acts only on the microphone signal for example, the loudspeaker signal being taken as reference signal on which various operations will be carried out as will be described subsequently in the description.

In FIG. 2a, in step A, the alternative choice of the reference signal and of the other signal is represented by the relation:

Choice of the reference signal/other signal=mike signal $X$ loudspeaker signal

The symbol X represents the alternative choice of the mike signal, respectively of the loudspeaker signal, as reference signal. The choice of the reference signal can be made for a plurality of uses of the method which is the subject of the invention, but can be modified as a function of the context of use.

The aforesaid step A is then followed by a step B consisting in synchronizing the audio acquisition and playback tasks by way of a specific synchronization process. The aforesaid step B thus makes it possible to reduce the sensitivity of the tasks for managing the audio streams in relation to the other tasks managed by the operating system and to which a higher priority has been allocated. It is recalled that the term task corresponds to the term "thread".

Specifically, in the case where the management of the audio acquisition/playback is performed on the basis of two independent "threads" in acquisition and playback mode, the activation of system tasks, such as for example the opening of another application, may cause one or the other of the audio acquisition/playback "threads" to halt as a function of their activation and of their priority. Depending on whether one or the other of the audio "threads" is affected, the stream of the microphone signal smic leads or lags with respect to the stream of the loudspeaker signal shp.

Step B represented in FIG. 2a, in accordance with a noteworthy aspect of the method which is the subject of the present invention, makes it possible to diminish this phenomenon by making the two audio acquisition/playback "threads" synchronous. With this aim, conventional mechanisms for synchronizing "threads" can be used as will be described subsequently in the description.

It is indicated in particular that the process for synchronizing the audio acquisition/playback tasks generated in step B has the effect of limiting the shift of the aforesaid audio streams without however canceling it completely, by reason of the fact that the shift introduced by the hardware, that is to say by the sound card, and by the API application software, may not be managed fully by such synchronization.

Furthermore, whereas a placing of the "threads" on standby by the operating system translates into a limited shift of the audio streams, this shift possibly corresponding to a shift which is less than the duration of a sample and hence imperceptible to the user, several successive placings on standby translate on the contrary into a more considerable aggregate shift, it not being possible for this aggregate shift to be completely reduced by the synchronization process implemented in the aforesaid step B. The shift can also be greater than the duration of a sample and hence be directly perceptible to the user.

Step B is then followed by a step C consisting in periodically measuring the existing delay between the other signal and the reference signal, each value of existing delay being denoted $re_j$ for example. In general, and according to a particularly noteworthy aspect of the method which is the subject of the present invention, it is indicated that the periodic measurement of the existing delay between the other signal and the reference signal is carried out periodically and continuously, over a portion of the signal, throughout the implementation of the method under the more detailed conditions which will be described subsequently in the description.

Step C is then followed by a step D consisting in validating the existing delay measurement for obtaining a current delay value, denoted $rc_n$, where the current delay value corresponds substantially to at least a value or a combination of values of earlier existing delays, this combination being effected upon a specific criterion which will be described subsequently in the description.

Of course, the step of validating the measurement of the existing delay as a current delay value is then accompanied by a command applied to the reference signal on the basis of the current delay so as to cancel the echo signal.

It is understood in particular that having regard to the value of current delay obtained, it is thus possible to control the delay applied to the adaptive filtering applied to the fraction of loudspeaker signal shp and of course to control the filtering coefficients of the aforesaid adaptive filter, so as to ensure tailoring of the correction signal sc making it possible by subtraction from the microphone signal smic to cancel the echo thus introduced. The delay applied to the reference signal can be implemented by storing this signal in a variable buffer, and read access to this stored signal with the delay applied by corresponding shifted addressing.

A more detailed description of the process for synchronizing the audio acquisition and playback tasks which is implemented in step B described previously in conjunction with FIG. 2a, will now be given in conjunction with FIGS. 2b and 2c in two nonlimiting preferred embodiments.

In general, it is indicated that the aforesaid process for synchronizing tasks can be carried out by way of the transmission of flags representative of a task synchronization time reference. These flags may be transmitted by the operating system OS for the attention of the relevant API application.

Figure 2B:
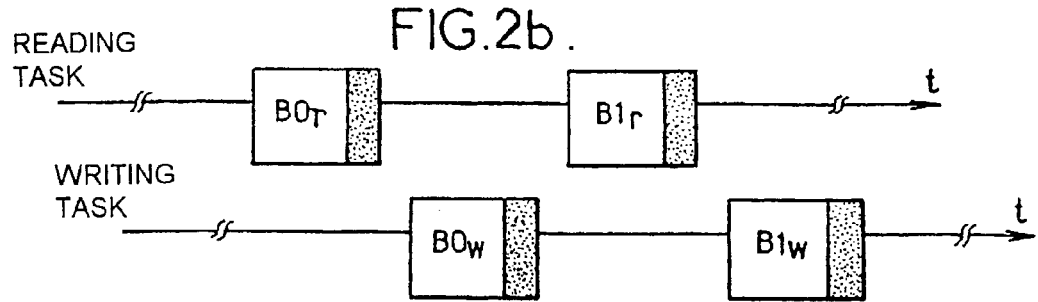
FIGS. 2b and 2c represent time charts of flags for synchronizing tasks.

With reference to FIG. 2b, it is indicated that the synchronization of the sound acquisition and playback "threads" can consist in synchronizing two independent tasks of acquisition or writing, respectively of audio playback or reading, by synchronized consecutive flags comprising, as represented in FIG. 2b, a command for acquisition, symbolized by W, respectively for playback or reading or writing, symbolized by R.

The aforesaid figure represents a time chart of synchronization between two independent tasks, the writing task being on standby awaiting the activation of the flag R, the flag activated when the reading task has completed the reading of the buffer $B_0$ for example, and conversely the reading task being on standby awaiting the activation of the flag W, flag activated when the writing task has completed the acquisition of the buffer $B_0$. The activation of the flags is represented shaded.

Figure 2C:
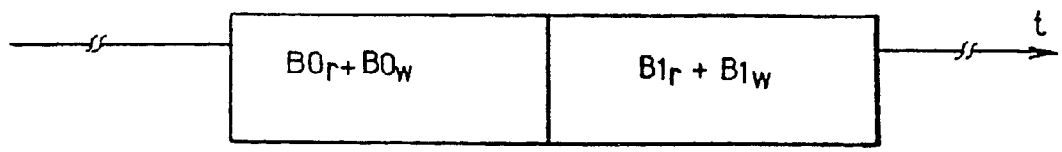

Furthermore, as represented in FIG. 2c, step B consisting in synchronizing the sound acquisition and playback tasks can consist advantageously in generating, on the basis of the operating system, a common sound acquisition/playback task. The aforesaid figure represents the indivisibility of the read management of a buffer $B_{0r}$ and write management of another buffer $B_{0W}$ for example in a common task. The mode of embodiment of synchronizing tasks as represented in FIG. 2c appears to be simpler and in fact saves on a command for executing tasks and of course a pause or a micropause for switching from one task to the other successively.

Figure 2D:
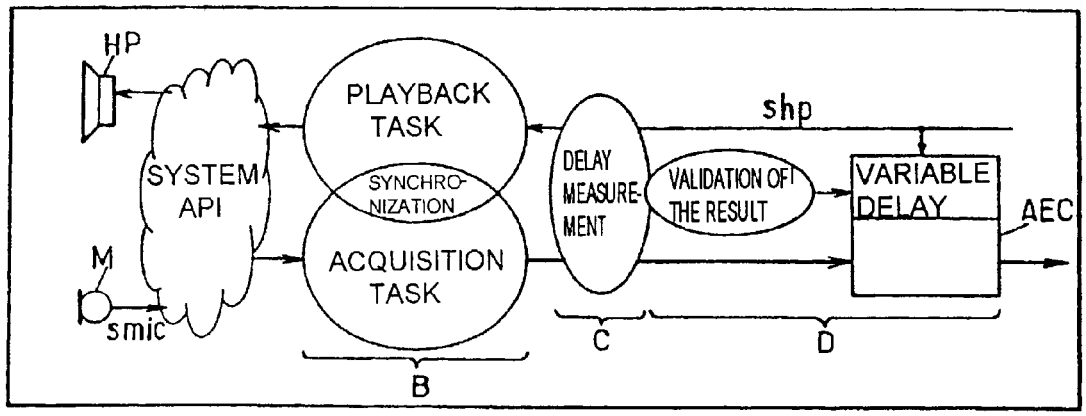
FIG. 2d represents, by way of illustration, a functional diagram of the relations between the various hardware and/or software modules of a system allowing the implementation of the real time processing and management method for echo cancellation between loudspeaker and microphone of a computer terminal, which is the subject of the invention.

Represented in FIG. 2d, by way of illustration, is a functional diagram of the relations between the various hardware and/or software modules of a system allowing the implementation of the real time processing and management method for echo cancellation between loudspeaker and microphone of a computer terminal in accordance with the subject of the present invention.

Although step A for choosing the reference signal is not represented in FIG. 2d, this choice corresponding to a conscious choice, for example for a developed software type, it is indicated that step B can be carried out in accordance with the process represented in FIG. 2b or 2c and that the steps of measuring the delay C and of validating each existing delay then of the command applied to the reference signal are then used to ensure the command of the variable delay applied to the latter and thus to ensure the filtering of the microphone signal smic by way of the filter AEC, as will be described subsequently in the description.

Figure 2E:
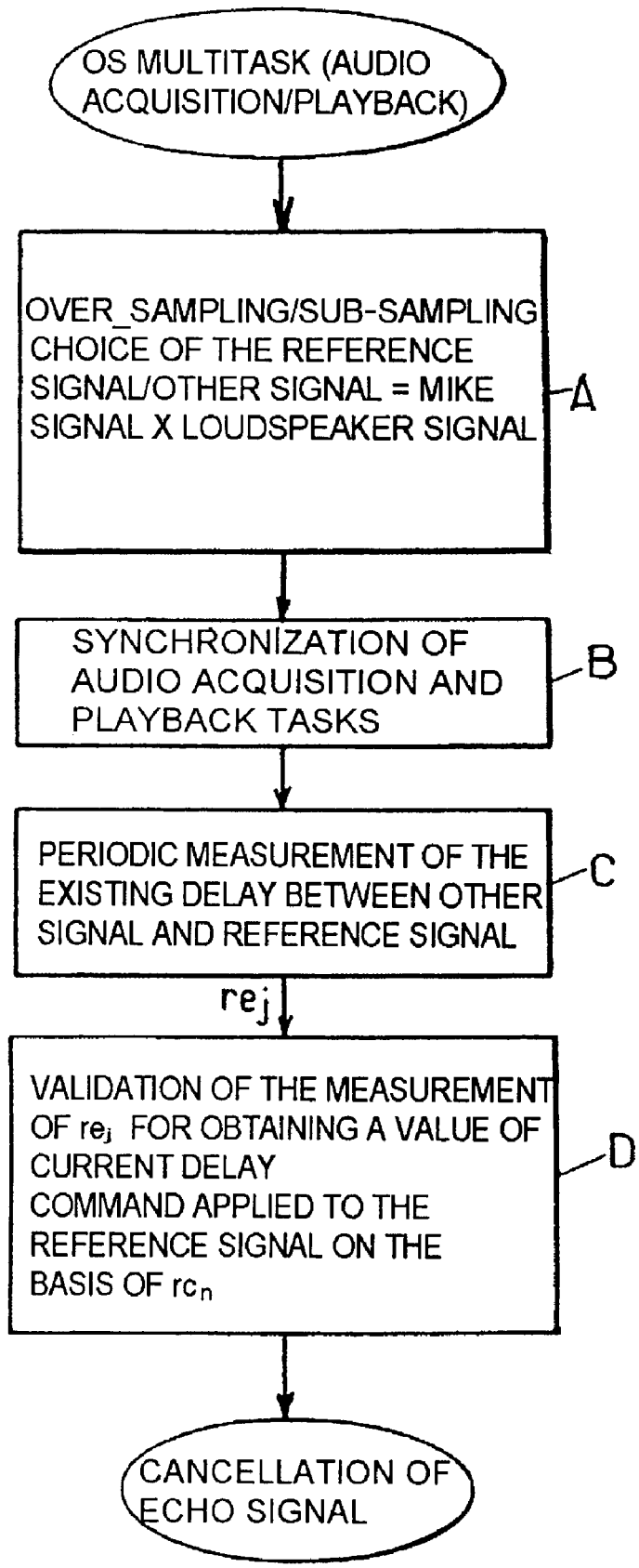
FIG. 2e represents, by way of illustration, a flowchart of the steps for implementing the method which is the subject of the invention in a preferred embodiment in which any risk of temporal drift between the microphone signal and the loudspeaker signal is eliminated.

As far as the aforesaid step A is concerned, the latter can consist, in a preferred mode of implementation of the method which is the subject of the invention, as represented in FIG. 2e, in performing either beforehand, or concomitantly with the choosing of the reference signal an auxiliary substep consisting in receiving, respectively in transmitting the samples of the microphone and loudspeaker signal at the maximum frequency of sampling of the system then to restore, by decimation, the samples and the sampled signal to the nominal sampling frequency. This process is conducted by control of oversampling, by way of the system, and initialization of the sound card with, as acquisition frequency parameter, the maximum clock rate, then management of the change of sampling frequency, command of subsampling, in a software manner in the acquisition/playback task or tasks. The aforesaid acquisition and playback tasks thus make it possible to manage the aforesaid signals, in such a way as to receive, respectively transmit, samples of the microphone signal smic, respectively of the loudspeaker signal shp, at the maximum frequency allowable by the sound card and to restore this frequency to its nominal value by way of a decimation, or subsampling. The aforesaid modus operandi makes it possible to eliminate the time drift which may exist between microphone signal smic and loudspeaker signal shp, because of direct transmission of the samples to the system and to the applications then the re-establishment of the sampling frequency by the acquisition/playback tasks.

Figure 3:
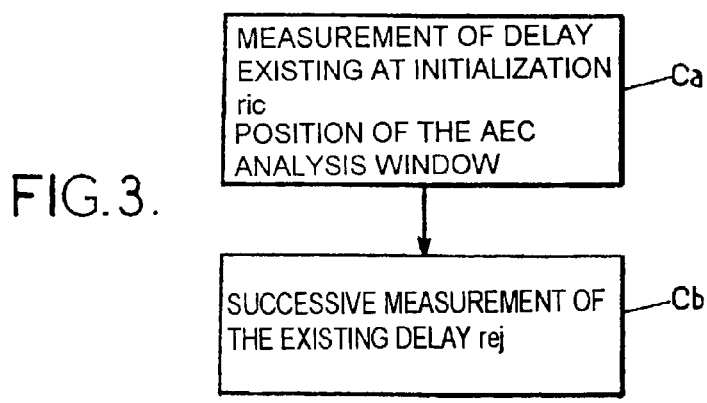
FIG. 3 represents a specific implementational detail of the step of periodic measurement of the existing delay between the reference signal and the other signal.

A more detailed description of step C consisting in measuring the existing delay between the other signal and the reference signal, it being possible for example for the reference signal to consist of the loudspeaker signal shp and the other signal of the microphone signal smic, will now be given in conjunction with FIG. 3.

With reference to the aforesaid figure, it is indicated that the step of measuring the delay can be carried out by way of a first substep Ca consisting in measuring the delay existing on the initialization of the method which is the subject of the invention or of the system so as to define a calibrated initial delay and thus make it possible to position the analysis window for the echo cancellation and in particular for the echo canceller upon the startup of the latter, that is to say of the adaptive filter AEC used for this purpose.

Substep Ca is then followed by substep Cb consisting in measuring the existing delay successively and continuously during the implementation of the method, taking into account the operations triggered by the operating system OS of the computer terminal.

More specifically, it is indicated that the delay on initialization depends on the hardware used, that is to say on the computer terminal and on the sound card with which this terminal is equipped. It depends of course on the operating system used, the WINDOWS NT® system generally being recognized as faster than the WINDOWS 98® system. Generally, it is indicated that the measurement of the delay existing on initialization ric constituting the calibrated value of delay can be conducted on the basis of any intrusive or nonintrusive measurement procedure. This calibrated value of initial delay ric then makes it possible to adjust the position of the analysis window for the echo canceller AEC and thus to allow the estimation of the impulse response of the physical parasitic coupling on initialization.

By way of example, for a constituent adaptive filter of the echo canceller AEC comprising 800 coefficients at 8 kHz, the analysis window exhibits a width of 100 ms. In the case where the delay between the stream of the loudspeaker signal shp constituting the reference signal, and the stream of the microphone signal smic is greater than 100 ms, for example 130 ms, it is not possible to cancel the corresponding echo in the absence of suitable positioning of the analysis window, since no correspondence exists between the two signals over the aforesaid temporal length of analysis. In the aforesaid example, it is then necessary to introduce a delay at least equal to 50 ms, the estimated impulse response lying, in the case of the introduction of such a delay at the limit of the analysis window. The delay introduced, for ideal positioning of the analysis window, can be taken slightly less than 130 ms over the stream of the reference signal so as to match up the two streams and obtain an impulse response spike at the start of the analysis window.

However, the delay between the loudspeaker signal shp, reference signal, and the microphone signal smic, alters from the initialization of the assembly, as mentioned previously, as a function of the managements of tasks performed by the operating system OS. Thus, this alteration justifies the implementation of step Cb in order to perform new successive measurements of delay throughout the communication and hence throughout the implementation of the method which is the subject of the present invention.

For the implementation of substep Cb, a nonintrusive measurement procedure is preferably used.

By way of nonlimiting example, a nonintrusive procedure can consist of a calculation of envelope correlation of energies of the reference signal, the loudspeaker signal, and of the other signal, the microphone signal, procedure as described in French patent application 2 733 867.

With reference to the procedure for calculating the envelope correlation of energies of the two aforesaid signals, it is indicated that when the presence of a loudspeaker signal HP has been detected by a device for detecting voice activity for example, the medium-term energies of the signal sent to the sound card and of the signal received by the mike are calculated. A suite of correlation coefficients for the two sliding envelopes is then deduced from these two signals. The spike of the correlation curve indicates the existing delay between the two signals.

A more detailed description of the substep for validating the measurement of existing delay for obtaining a value of current delay, substep implemented in step D described in conjunction with FIG. 2a, will now be given in conjunction with FIGS. 4a and 4b.

Figure 4A:
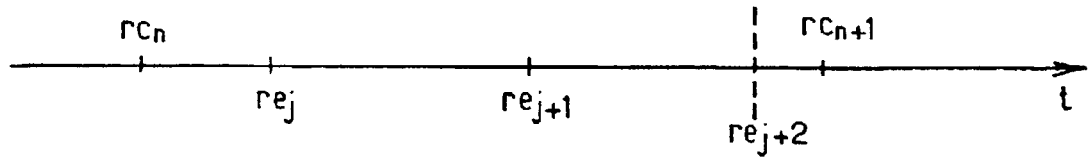
FIG. 4a represents a time chart relating to a process for validating existing delay values measured as current delay values.

In FIG. 4a, $re_j$ designates the measurement of existing delay and $rc_n$ the values of current delay.

Thus, $re_j$ and $re_{j+1}$ designate two successive existing delays of rank j and j+1 following a previous current delay, designated $rc_n$, the current delay arising from the validation of the successive existing delays $re_j$ and $re_{j+1}$ itself being designated $rc_{n+1}$.

With reference to FIG. 4a, it is indicated that the step consisting in validating the measurement of the existing delay $re_j$ so as to obtain a value of current delay $rc_{n+1}$ consists at least in detecting the discrepancy in delay between at least one of the aforesaid successive existing delays $re_j$ and $re_{j+1}$ following the previous current delay $rc_n$ and the value of this previous current delay $rc_n$. This discrepancy in delay is denoted:

$$\delta re_j, c_n = re_j - rc_n$$

$$\delta re_{j+1}, c_n = re_{j+1} - rc_n$$

The value of this discrepancy or of these discrepancies is compared with a value of specified duration, denoted $\tau$. This value of specified duration can for example be taken equal to 15 ms as a function of the characteristics of the relevant computer terminal, as will be described subsequently in the description.

On termination of the aforesaid comparison step, the substep then consists in validating as value of current delay $rc_{n+1}$ at least one of the successive existing delays or a linear combination of them if this discrepancy in delay is greater than this specified duration $\tau$.

The previous value of current delay $rc_n$ is validated as next value of current delay $rc_{n+1}$ otherwise.

According to a particularly advantageous aspect of the method which is the subject of the present invention, it is indicated that the value of the specified duration $\tau$ is adjusted as a function of the value of the current delay. This makes it possible to introduce a characteristic of flexibility and of adaptability of the method which is the subject of the present invention to computer terminals of any type equipped with the most diverse operating systems. Typically, the specified duration $\tau$ can be adjusted between a maximum value substantially equal to 30 ms and a minimum value substantially equal to 10 ms. The law for adapting the value $\tau$ between aforesaid maximum and minimum values can be established experimentally.

Figure 4B:
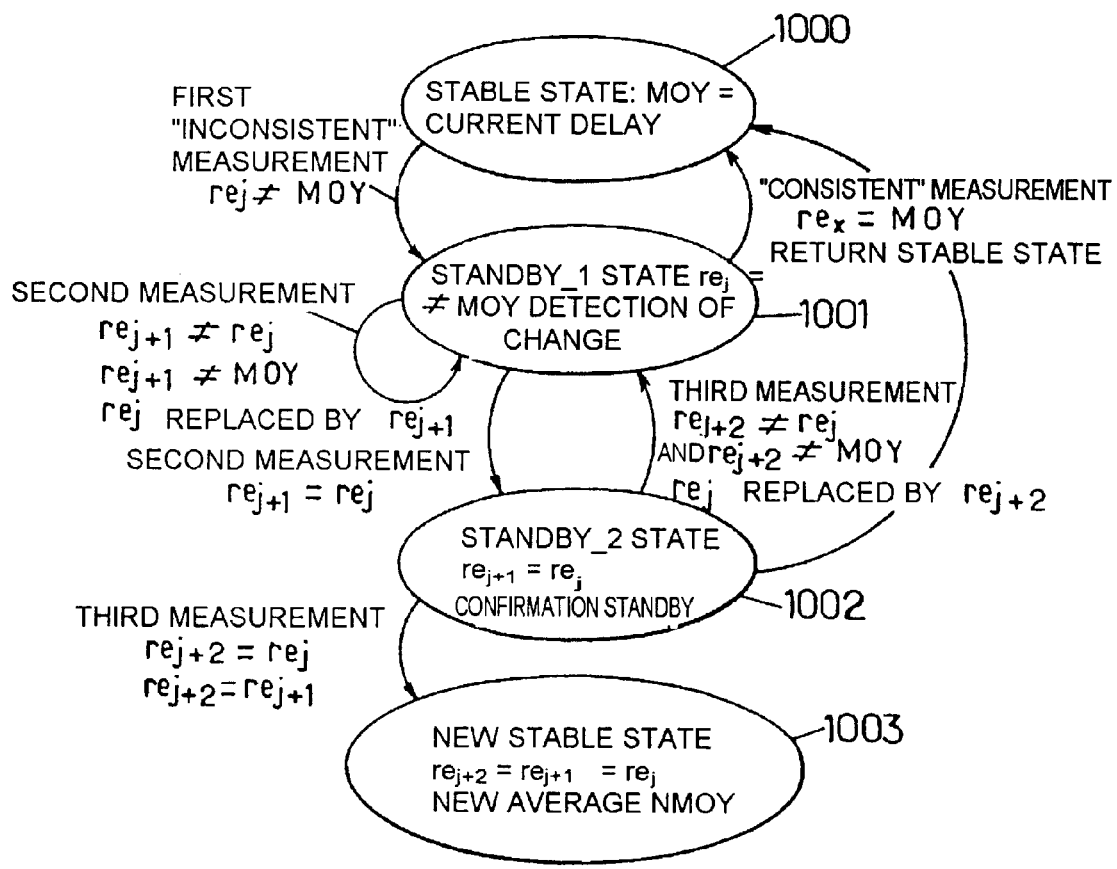
FIG. 4b represents a sequential flowchart illustrating a process for validating existing delay values measured as current delay values.

The above-cited management of the values of current delay can then be carried out sequentially, as represented in FIG. 4b, so as to ensure optimization of the filtering and of the echo cancellation. This optimization corresponds, apart from the taking into account of two successive values of existing delay $re_j$, $re_{j+1}$, of the next value of existing delay $re_{j+2}$. Represented in FIG. 4b is the current delay taken equal to a value designated MOY as corresponding to a stable state in step 1000, this average value satisfying the relation:

$$MOY = rc_n.$$

The value MOY can correspond to an average value as will be described hereinbelow in the description.

As soon as a first different, so-called inconsistent, measurement appears, such that $re_j \neq MOY$, the occurrence of such a situation leads to a situation 1001 which is a standby state 1 following the detection of the aforesaid change.

Upon the occurrence of a second value of existing delay, second measurement $re_{j+1}$, different from the previous value of existing delay $re_j$ and from the previous average value MOY, the previous value of existing delay $re_j$ is replaced by the value of existing delay $re_{j+1}$. This replacement is represented in FIG. 4b by the closed loop at the level of the standby state 1001.

Conversely, on the occurrence of a second measurement of value of existing delay $re_{j+1}$ identical to the previous value of existing delay $re_j$, the standby state 1 of step 1001 is followed by a standby state 2 of 1002 corresponding to the equality of the values of existing delays $re_j$ and $re_{j+1}$, this standby state 1002 corresponding to a confirmation standby.

Upon the occurrence of a third measurement of value of existing delay $re_{j+2}$ equal to the previous values of existing delay $re_{j+1}$ and $re_j$, the aforesaid standby state 1002 is followed by a new stable state 1003 in the course of which a new average NMOY is calculated corresponding to the average of the three values of successive existing delays $re_j$, $re_{j+1}$ and $re_{j+2}$.

Conversely, on the occurrence of a third value of existing delay $re_{j+2}$ different from the value of the first value of existing delay $re_j$ and from the average value of the current stable state, in this instance the average value MOY of the above-cited step 1000, the value of the third measurement of existing delay $re_{j+2}$ is then used to replace the value of the first measurement of existing delay $re_j$, the standby state 1002 being restored to the standby state 1001 for detecting a change.

Any so-called consistent measurement of the existing value of delay of subsequent rank on the basis of the standby states 1001 and 1002, subsequent measurement denoted $re_x$ whose value corresponds to the current average value, restores the process to the previously mentioned stable state 1000.

A more detailed description of the process for command of the delay of the reference signal, on the basis of the value of current delay $rc_n$, established as described previously, will now be given in conjunction with FIGS. 5a, 5b and 5c.

More specifically, it is indicated that the aforesaid process can be implemented by virtue of a memory of the computer terminal and of two pointers $P_{write}$ and $P_{read}$ addressing this memory, the pointer $P_{write}$ being dedicated to the writing of the samples of the reference signal and the pointer $P_{read}$ to the reading of the delayed samples of this same signal.

Figure 5A:
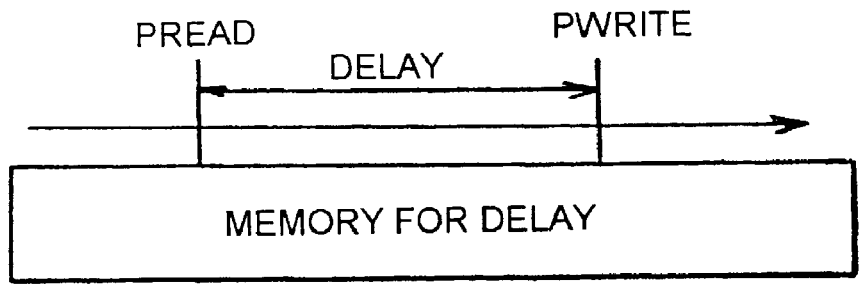
FIGS. 5a, 5b and 5c represent by way of illustration charts for control of the delay of the reference signal, loudspeaker signal or microphone signal, on the basis of each current delay value, established on the basis of one or more successive existing delay values.

With reference to FIG. 5a, it is indicated that the value of the delay, equal to the value of current delay, is given by the following relation:

$$P_{write} - P_{read} = \text{delay} \times \text{duration of sampling period},$$

the delay value being expressed as a number of samples.

The management of the aforesaid two pointers is such that $P_{write}$, $P_{read}$ is incremented by one unit with each write or read operation respectively.

Figure 5B:
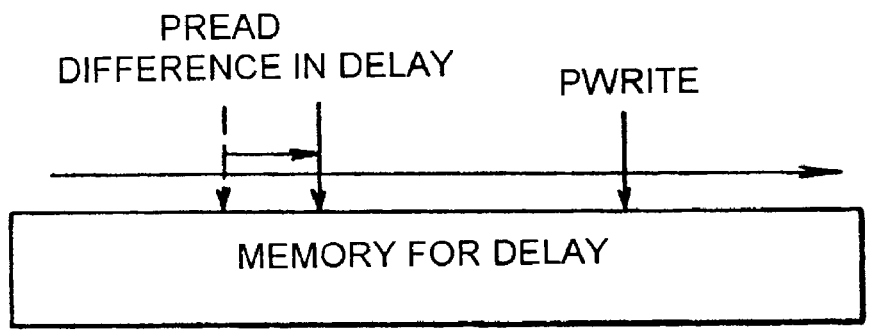
Figure 5C:
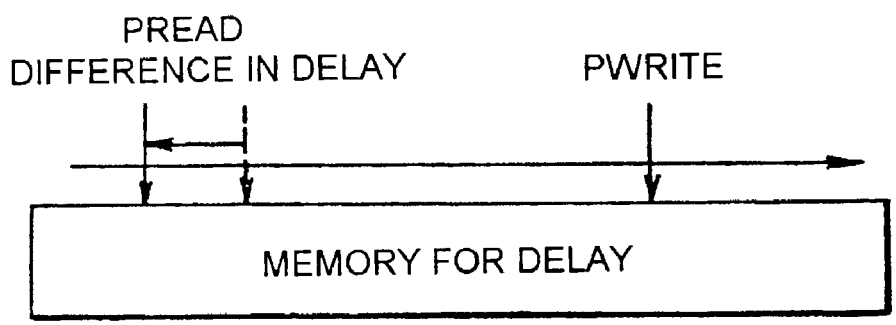

Upon a modification of the delay value, the pointer $P_{read}$ should be modified as follows, with reference to FIGS. 5b and 5c:

if, as represented in FIG. 5b, the delay decreases, the read pointer $P_{read}$ is incremented, brought closer, to the write pointer $P_{write}$ by a quantity equal to the decrease in the delay. This quantity cannot exceed the value of the current delay;

if conversely, as represented in FIG. 5c, the delay increases, the read pointer is decremented, moved away, by a quantity equal to the increase in the delay.

However, in all cases, any memory overflow problem should be avoided. Thus, on the basis of a tailored initial positioning of the analysis window for the adaptive filter AEC, it is possible to obtain a cancellation or an optimal reduction of the echo signal.

There has thus been described a real time processing and management method for echo cancellation between a loudspeaker and a microphone of a computer terminal which is especially effective insofar as, of software design, this method can be installed on any workstation, any personal computer, regardless of the operating system used by them.

In particular, the aforesaid implementation allows generalization of communication tools of this type for which all the audio functions call upon the sound card of the relevant computer terminal and in particular API applications when the operating system consists for example of an operating system from the WINDOWS® family. The method thus implemented makes it possible to circumvent all specific cards and in particular add-on cards, the method which is the subject of the present invention then being implemented by a purely software means in the host machine. The echo cancellation function is thus instituted as a task in its own right in the same way as the tasks customarily managed by aforesaid operating systems.

The invention claimed is:

1. A real time processing and management method for echo cancellation between a loudspeaker and a microphone of a computer terminal managed by an operating system that executes a plurality of variable-priority tasks including an audio acquisition thread and a playback thread, the echo being caused by parasitic physical coupling between the loudspeaker delivering a loudspeaker signal and the microphone receiving a microphone signal and corrected by subtracting from the microphone signal a correction signal formed by a fraction of the loudspeaker signal delayed and filtered, wherein it comprises the steps of:

choosing a reference signal from two signals: a) the loudspeaker signal, and b) the microphone signal, the other of the two signals being a non-reference signal;

synchronizing the non-reference signal with respect to the reference signal;

synchronizing the audio acquisition and playback threads;

periodically measuring the existing delay between the non-reference signal and the reference signal, so as to obtain a measured value of existing delay;

validating the measurement of existing delay so as to obtain a value of current delay and controlling the delay applied to said reference signal on the basis of this current delay, thereby making it possible to cancel said echo signal.

2. The method as claimed in claim 1, wherein the step of choosing a reference signal and in synchronizing the non-reference signal comprises an auxiliary substep that is at least one of: a) receiving the samples of the microphone signal, and b) transmitting the samples of the loudspeaker signal at the maximum frequency of sampling of the computer system then restoring, by decimation, this sampling frequency to its nominal value, thereby making it possible to eliminate the drift which may exist between the loudspeaker signal and the microphone signal, for operation at the nominal sampling frequency.

3. The method as claimed in claim 1, wherein the step of synchronizing the sound acquisition and playback threads consists of synchronizing the two threads on the basis of a task synchronization time reference.

4. The method as claimed in claim 1, wherein the step of synchronizing the sound acquisition and playback threads consists of generating, on the basis of the operating system, a common sound acquisition, playback task.

5. A real time processing and management method for echo cancellation between a loudspeaker and a microphone of a computer terminal managed by an operating system that executes a plurality of variable-priority tasks including an audio acquisition thread and a playback thread, the echo being caused by parasitic physical coupling between the loudspeaker delivering a loudspeaker signal and the microphone receiving a microphone signal and corrected by subtracting from the microphone signal a correction signal formed by a fraction of the loudspeaker signal delayed and filtered, wherein it comprises the steps of:

choosing a reference signal from two signals: a) the loudspeaker signal and b) the microphone signal, the other of the two signals being a non-reference signal;

synchronizing the non-reference signal with respect to the reference signal;

synchronizing the audio acquisition and playback threads;

periodically measuring the existing delay between the non-reference signal and the reference signal, so as to obtain a measured value of existing delay, said measuring of the existing delay between the non-reference signal and the reference signal comprising the sub-steps of:

measuring the delay existing on initialization, so as to define a calibrated initial delay and positioning the analysis window for the echo cancellation; and measuring this existing delay successively taking into account the operations triggered by the operating system of said computer terminal;

the method further comprising the step of:

validating the measurement of existing delay so as to obtain a value of current delay and controlling the delay applied to said reference signal on the basis of this current delay, thereby making it possible to cancel said echo signal.

6. The method as claimed in claim 5, wherein the step of successively measuring this existing delay is carried out on the basis of a nonintrusive measurement process.

7. The method as claimed in claim 6, wherein the step of validating the measurement of the existing delay ($re_j$) so as to obtain a value of current delay ($rc_{n+1}$) comprises at least the steps of:

detecting the discrepancy in delay between at least one of the successive existing delays ($re_j$) ($re_{j+1}$), following the previous currently delay ($rc_n$), and this previous current delay ($rc_n$)

comparing this discrepancy delay with a specified duration, and validating as value of current delay ($rc_{n+1}$) at least one of the successive existing delays if this discrepancy in delay is greater than this specified duration, and validating as value of current delay ($rc_{n+1}$) the previous value of current delay ($rc_n$) otherwise.

8. The method as claimed in claim 7, wherein the specified duration is adjusted between a maximum value and a minimum value, as a function of the current delay.

9. The method as claimed in claim 1, wherein controlling the delay is performed in software separated from the microphone and speaker by the system application program interface.

* * * * *